8572X
E. Nott,
Cook Stove.
Patented Jan. 7. 1835.
XXXIX
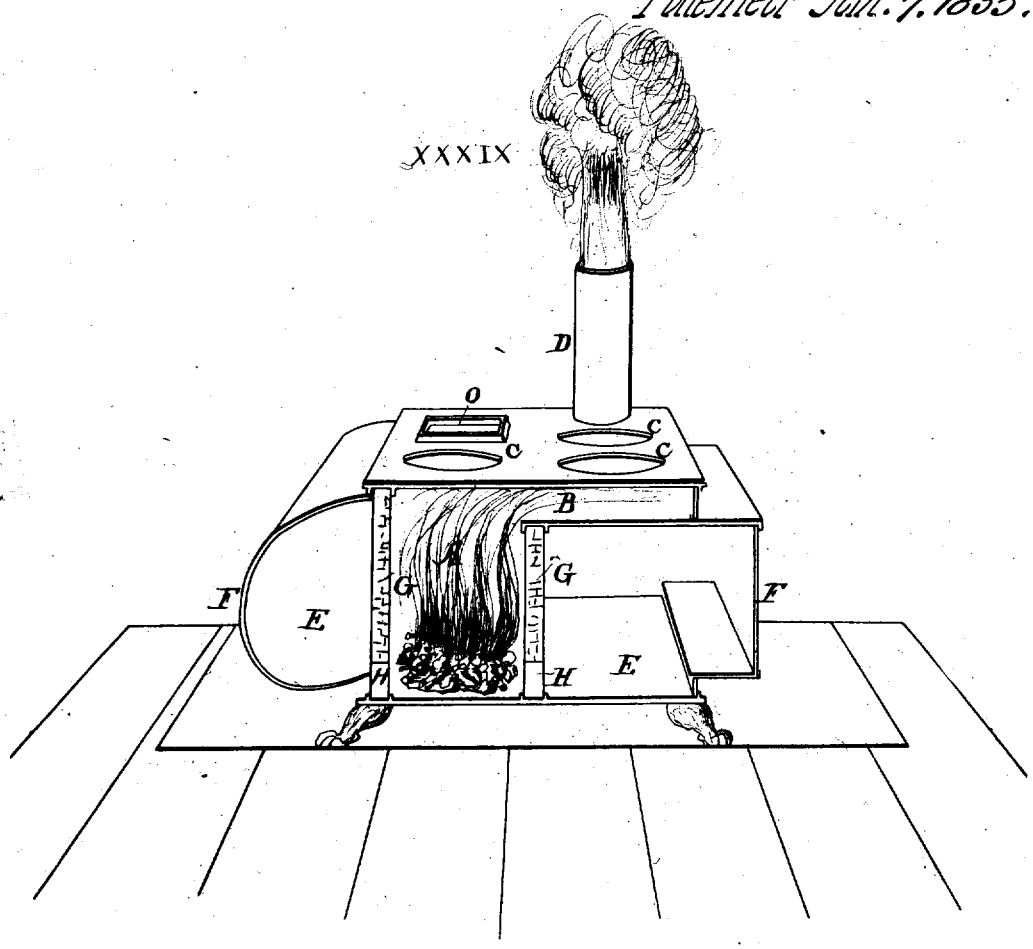

Jan. 7. 1835

Eliphalet Nott) 1. 3

8572X

Letters Patent.

The Schedule referred to in these Letters Patent and making part of the same, containing a description in the words of the said Eliphalet Nott, himself, of his Improvement for correcting the smell from cook stoves, and improving the quality and flavor of articles cooked therein.

---

Specification of improvements made for equalizing the heating, and correcting the smell from cook stoves, and for improving the quality & flavor of articles cooked therein, especially where Anthracite coal is the fuel in use. Whereas in cook stoves, having ovens constructed of iron plates, through which the heat is transmitted from the flame in passing along and around the same, the heat is variable, the smell offensive, and the quality and flavor of the articles cooked, injured. Therefore an improvement has been introduced, which consists in substituting ovens, the crust of which, so far as the same is exposed to the action of the interior furnace or flues, but especially the furnace, is constructed in whole or in part, of brick, stone, or other material, that is a poor conductor, and so far as the same is exposed to the action of the exterior air, is constructed of tin, polished brass or other material that is a good reflector; and also in so opening an aperture for the escape of steam to the flue in ovens heated laterally. The form and relative position of which furnace flue, & ovens, may be varied at pleasure, provided only the whole be so combined that the heat from the furnace and flue be transmitted to the oven through brick or stone &c, on the inside, and reflected from tin, polished brass, &c, on the outside; — For For further information reference may be had to the explanations and drawings connected herewith.

Summary.

The invention and improvement herein contemplated, consist in equalizing the heat, correcting the smell, and improving the quality & flavor of articles cooked in stoves, by so constructing and combining the furnace, flue, & rooms, that the heat shall be transmitted from the former to the latter, through brick or stone, &c, on the inner side, and reflected from tin, polished brass, or other reflector, on the outer side, in place of being as heretofore, transmitted through and reflected from iron.

I therefore claim as my invention & improvement, the construction and combination of the furnace, flue and room, whether fixed or moveable, in a cook stove, especially where anthracite coal is the fuel in use, in the manner, and for the purposes set forth, together with the uses to which the same has been or may hereafter be applied.

Witnesses

Exd. J. W. Jones
[illegible] James D. Howard

Elipht. Nott (442 words)

(Granted January 7. 1835.)

(Drawing.)